United States Patent
Falk

(10) Patent No.: US 9,858,446 B2
(45) Date of Patent: Jan. 2, 2018

(54) TAMPER PROTECTION DEVICE FOR PROTECTING A FIELD DEVICE AGAINST TAMPERING

(75) Inventor: Rainer Falk, Poing (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 14/112,530

(22) PCT Filed: Apr. 11, 2012

(86) PCT No.: PCT/EP2012/056516
§ 371 (c)(1),
(2), (4) Date: Oct. 17, 2013

(87) PCT Pub. No.: WO2012/143270
PCT Pub. Date: Oct. 26, 2012

(65) Prior Publication Data
US 2014/0041061 A1     Feb. 6, 2014

(30) Foreign Application Priority Data
Apr. 18, 2011 (DE) .......................... 10 2011 007 571

(51) Int. Cl.
*G06F 1/26* (2006.01)
*G06F 11/00* (2006.01)
(Continued)

(52) U.S. Cl.
CPC .............. *G06F 21/87* (2013.01); *G05B 9/02* (2013.01); *G05B 2219/25428* (2013.01); *G05B 2219/33331* (2013.01); *G05B 2219/37038* (2013.01)

(58) Field of Classification Search
CPC .......... G06F 21/86; G06F 21/87; G06F 21/60; G06F 21/72; G06F 21/78; H01L 23/57;
(Continued)

(56) References Cited

U.S. PATENT DOCUMENTS 5,185,717 A * 2/1993 Mori ...................... G06F 21/87
365/52
5,912,621 A    6/1999 Schmidt
(Continued)

FOREIGN PATENT DOCUMENTS

| WO | 2004055918 | 7/2004 |
| WO | 2004078787 | 9/2004 |
| WO | 0163994 QQQ | 8/2011 |

OTHER PUBLICATIONS

German Office Action dated Nov. 30, 2012 for corresponding German Patent Application No. DE 10 2011 007 571.2 with English translation.
(Continued)

*Primary Examiner* — Fatoumata Traore
*Assistant Examiner* — Trong Nguyen
(74) *Attorney, Agent, or Firm* — Lempia Summerfield Katz LLC

(57) ABSTRACT

The disclosure relates to a tamper protection device for protecting a field device against tampering. The tamper protection device includes a carrier and at least one electronic memory, wherein the at least one electronic memory is disposed in at least one partial area on the carrier, and the at least one electronic memory stores at least one predefinable security information item. The at least one electronic memory is configured to modify the predefinable security information item in the event of at least partial damage to the tamper protection device. The disclosure further relates to a method for producing a field device having a tamper protection device, to a field device comprising a tamper protection device, to a tamper protection system, and to the use of a tamper protection device.

18 Claims, 2 Drawing Sheets

(51) Int. Cl.
*G08B 13/00* (2006.01)
*G08B 21/00* (2006.01)
*G08B 29/00* (2006.01)
*G06F 21/87* (2013.01)
*G05B 9/02* (2006.01)

(58) Field of Classification Search
CPC .............. H01L 23/573; H01L 23/576; G05B 2219/37038; G05B 9/02; G05B 2219/25428
USPC .................................................. 713/190–194
See application file for complete search history.

(56) References Cited

U.S. PATENT DOCUMENTS

| | | | |
|---|---|---|---|
| 7,685,438 B2 | 3/2010 | Knudsen | |
| 2005/0274630 A1* | 12/2005 | Clark | H05K 3/284 206/1.5 |
| 2007/0174854 A1* | 7/2007 | Jungermann | G06K 19/06009 720/600 |
| 2007/0255966 A1* | 11/2007 | Condorelli et al. | 713/194 |
| 2008/0192240 A1 | 8/2008 | Tucker et al. | |
| 2009/0106563 A1* | 4/2009 | Cherpantier | 713/194 |
| 2011/0031985 A1 | 2/2011 | Johnson | |
| 2012/0140929 A1* | 6/2012 | Clark | G06F 21/79 380/277 |

OTHER PUBLICATIONS http://www.datasheetarchive.com/AT98SC008CT-datasheet.html, webpage, pp. 1-2, Apr. 18, 2011.

Klaus Kursawe, "Reconfigurable Physical Unclonable Functions - Enabling Technology for Tamper-Resistant Storage", 2009 IEEE International Workshop on Hardware-Oriented Security and Trust (HOST), 2009, pp. 22-29.

PCT International Search Report dated Jul. 26, 2012 for corresponding PCT/EP2012/056518 with English translation.

* cited by examiner

TAMPER PROTECTION DEVICE FOR PROTECTING A FIELD DEVICE AGAINST TAMPERING

This application is the National Stage of International Application No. PCT/EP2012/056516, filed Apr. 11, 2012, which claims the benefit of German Patent Application No. DE 10 2011 007 571.2, filed Apr. 18, 2011. The entire contents of both documents are hereby incorporated herein by reference.

BACKGROUND

The present embodiments relate to protecting a field device against tampering.

Field devices are used in a variety of areas of technology (e.g., in the form of signal installations as traffic lights, railway signals or the like). Field devices may be connected to a control device (e.g., a control station or similar apparatus) in order to control the field devices using control signals. A field device of this type may include a control computer to process the control signals. A configuration memory is connected to the control computer. The control computer and configuration memory are provided for the control of the field device. The control computer may be connected to an input/output unit of the field device, via which sensor signals of additional sensors may be transferred (e.g., sensors that monitor a rotation speed of an actuator of the field device or similar). In addition, the field device also includes a communication interface for communication with the control station.

In order to avoid manipulations on the field device and, for example, on the control computer and the configuration memory the control computer and the configuration memory are provided with a sealing compound (e.g., an epoxy resin or the like). Accessibility to the control computer and the configuration memory is thereby hindered, and a certain tamper protection is achieved.

Due to the protection of the control computer and the configuration memory against tampering, the configuration data stored in the configuration memory (e.g., cryptographic keys for the communication with the control station) are protected against manipulations, or the manipulation is at least hindered.

An integrated circuit that has a tamper protection is, for example, the ATMEL AT98. The data for the ATMEL AT98 is downloadable at http//www.datasheetarchive.com/AT98SC008CT-datasheet.html.

In addition, sensors may be located on the field device in order to detect a manipulation of the control computer or the configuration memory. These sensors may, for example, be disposed inside or outside a tamper-protected area. A wire mesh may be provided in the tamper-protected area. The wire mesh is connected to a corresponding sensor to apply electrical signals to the wire mesh. If an attacker then carries out a manipulation on the control computer or on the configuration memory of the field device (e.g., by drilling into the sealing compound) in order to achieve a contacting of the control computer and/or the configuration memory to read out data in order to be able to manipulate the configuration memory, the wire mesh will, with a certain high probability, be destroyed. In order to achieve an effective tamper protection, a continuous monitoring of the wire mesh by the corresponding sensor is provided. Otherwise, an attacker may remove the wire mesh (e.g., if a device was switched off), may analyze the wire mesh and reconstruct an electrically equivalent wire mesh before putting the field device back into operation and before the device is connected to the control station. The field device itself and also the control station may not then detect whether or to what extent the field device has been manipulated.

A continuous monitoring also uses a corresponding energy supply that incurs additional costs. The condition of the energy supply is checked continuously in order to enable a reliable protection of the field device against tampering.

U.S. Pat. No. 7,685,438 introduces magnetic particles into a protective layer of an integrated circuit. The magnetic particles may be detected by sensors, and a cryptographic key may be produced using the detected information relating to the magnetic particles. If the protective layer of the integrated circuit is removed, the information required to generate the cryptographic key is therefore also destroyed.

It is known from US Patent Application No. 2008/192240 to evaluate a characteristic property of an optical waveguide in order to detect a physical manipulation of the optical waveguide.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a simple and low-cost tamper protection device that, for example, even without an uninterrupted monitoring, reliably enables detection of a physical manipulation of a field device provided with the tamper protection device is provided.

In one embodiment, a tamper protection device for protecting a field device against tampering is provided. The tamper protection device includes a tamper protection carrier and at least one electronic memory. The at least one electronic memory is disposed in at least one partial area on the tamper protection carrier, and the at least one electronic memory stores at least one predefinable security information item. The at least one electronic memory is configured to modify the predefinable security information item in the event of an at least partial damage to the tamper protection device.

In another embodiment, a method for manufacturing a field device with a tamper protection device is provided. The method includes the acts of manufacturing the field device, manufacturing the tamper protection device, disposing the tamper protection device on the field device, and connecting the tamper protection device to a monitoring device to monitor the tamper protection device.

In another embodiment, a field device including a tamper protection device is provided.

In one embodiment, a tamper protection system is provided. The tamper protection system includes at least one field device, at least one tamper protection device, and at least one monitoring device. The tamper protection device is disposed on the field device for the tamper protection. The monitoring device is connected to the tamper protection device.

In another embodiment, a tamper protection device in and/or on a field device, and the use of a tamper protection device as a security seal are provided.

The advantage is that a tamper protection device that is irreparably destroyed in the event of a physical manipulation (e.g., a drilling into, breaking open or the like) is provided. The security information in the electronic memory of the tamper protection device at least partially destroyed by the physical manipulation may therefore no longer be reconstructed. In this way, a physical manipulation of a field device with a tamper protection device of this type is detectable based on the destroyed security information. A further advantage is that a continuous or ongoing monitoring of the tamper protection is not necessary, since a physical manipulation is also subsequently detectable based on the modified or destroyed memory content and therefore a changed security information item. A further advantage is that no complex sensor system (e.g., pressure sensors, radiation sensors, temperature sensors or similar) needs to be provided, thereby reducing manufacturing costs.

The tamper protection carrier is configured as a foil (e.g., as a plastic foil). The advantage gained here is that the at least one electronic memory may be disposed on the tamper protection carrier in a simple and low-cost manner, and a simple arrangement of the foil (e.g., on a printed circuit board) is simultaneously enabled. The at least one electronic memory may, for example, be configured as an electronic circuit printed onto the foil. The memory may, for example, be imprinted flatly on the foil, thus covering at least a partial area of the foil. The memory may be configured in a plurality of layers imprinted above one another and isolated from one another.

The foil may be glued onto a carrier (e.g., a printed circuit board). The foil may also be wrapped around the printed circuit board and glued or welded. A foil bonded with the printed circuit board may also be protected by applied epoxy resin and/or may be molded in epoxy resin.

The at least one electronic memory is appropriately configured to store the security information permanently or modifiably. The advantage is that, if the security information is permanently stored in the electronic memory, the information may be stored directly during the manufacture of the memory (e.g., by the aforementioned imprinting of the electronic circuit), in the memory, so that a simple and low-cost storage of the security information is enabled. If the security information in the at least one electronic memory is modifiable (e.g., during an operation of the field device), the security information may be recreated and/or overwritten daily, hourly, by the minute or the like. A continuous overwriting of the electronic memory with new security information is also possible. In this way, the security may be even further increased, since, based on the essentially constant updating of the at least one electronic memory, the security may also be established when the respective security information was stored in the at least one electronic memory, and when a physical manipulation of the at least one electronic memory took place. Following a physical manipulation of the tamper protection device, the security information may no longer be further modified, since the at least one electronic memory has been totally or partially destroyed. If it is simultaneously known which security information was written and when the security information was written into the at least one electronic memory, the time of the physical manipulation may then be determined.

The at least one electronic memory is configured to provide a second information item dependent on and different from the security information. In this way, for example, based on the security information, a cryptographic key may be generated directly and/or by a key derivation function and/or a cryptographic hash function (e.g., SHA-1, SHA256, HMAC-SHA-1, HMAC-SHA256). The cryptographic key may be used, for example, in order to carry out a decryption of data of the field device, and alternatively or additionally, an error detection and/or an error correction method may be applied during the creation of the cryptographic key, so that modified content of a configuration memory of the field device is detectable and, for example, at least partially correctable.

The security information may be configured as a digitally coded bit sequence.

The security information density of the security information appropriately has a size of at least 32 bits, 64 bits, 128 bits, 256 bits, 512 bits, or 1024 bits, for example, for each unit area, where the unit area is less than 5 cm$^2$, 2.5 cm$^2$, 1 cm$^2$, 5 mm$^2$, or 1 mm$^2$. As a result, the security information stored in the at least one electronic memory is not feasibly guessable.

An even greater protection against physical manipulation is achieved, since, with a spatially small physical manipulation of the tamper protection device, many bits of the security information are already modified or destroyed due to the physical manipulation of the electronic memory.

A plurality of electronic memories that are configured to provide a common security information item are provided. The memory requirement of the electronic memories may thus be substantially reduced, so that the memories may be manufactured even more economically and reliably.

In the tamper protection system, the monitoring device is appropriately configured to check a security information item of the tamper protection monitoring device and deactivate or activate the field device depending on the result of the check.

The advantage thus gained, particularly if the monitoring device is disposed in the field device itself, is that the field device itself may change from an active to an inactive condition so that a further attack on the field device is further hindered for an attacker, if the check reveals a manipulation of the security information. The field device may then, for example, autonomously delete keys stored in a configuration memory or provide a status message and/or transmit the status message to a control station. Alternatively, the field device may permanently destroy electronic components of the field device by a short circuit in order to prevent an attack on said components.

DETAILED DESCRIPTION

Figure 1:
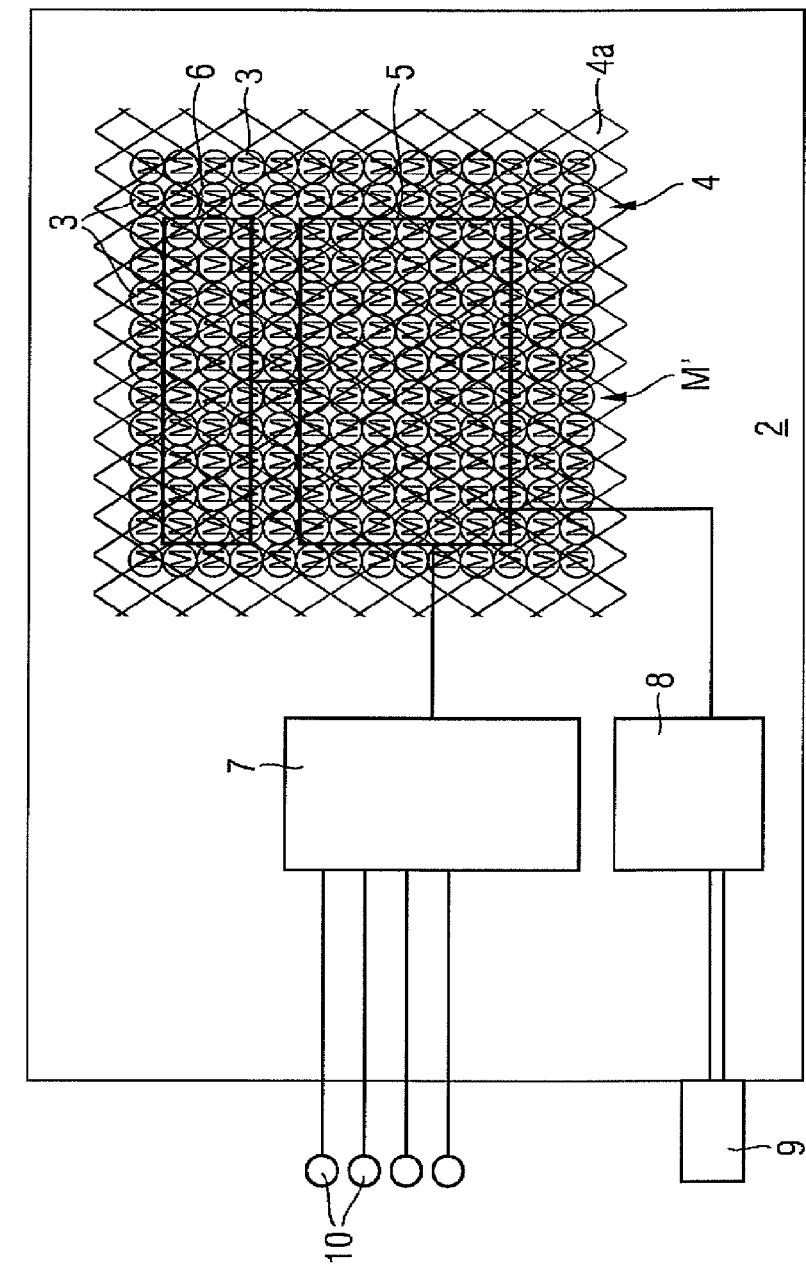
FIG. 1 shows a field device with a tamper protection device according to a first embodiment.

In FIG. 1, reference number 1 denotes a field device. The field device 1 includes a carrier 2, for example, in the form of a printed circuit board. A control computer 5 (e.g., a CPU or the like) that is connected to a configuration memory 6 for exchanging data is disposed on the carrier 2. The control computer 5 is connected via a line to a network module 8 that provides an interface 9 for transmitting data to a control station (e.g., via Ethernet).

The control computer 5 is further connected via a line to an input/output unit 7. The input/output unit 7 is connected to sensors and/or actuators 10 (e.g., temperature sensors, control elements, etc.). If, for example, the field device 1 is configured as a signal installation for trains, the input/output unit may transfer corresponding commands to motors 10, etc., of the signal installation by the control computer 5. Simultaneously, a check may be carried out by the sensors 10 to determine whether the signal installation has properly carried out the instruction received from the control computer 5.

FIG. 1 also shows a dotted, rectangular area that essentially covers the control computer 5 and the configuration memory 6. A tamper protection device 4 is disposed in this area. The tamper protection device 4 includes a tamper protection foil 4a as a tamper protection carrier, on which electronic memories 3 are disposed (e.g., in a regular manner). The tamper protection foil 4a with the electronic memories 3 is disposed such that the electronic memories 3 completely cover the control computer 5 and the configuration memory 6 and thus provide a tamper protection for the control computer and the configuration memory. Respective interconnections of the individual electronic memories and at least one connection of the electronic memories 3 to an interface of the control computer 5 and/or the configuration memory 6, in order to be able to retrieve or read out the security information M stored in the electronic memories, are not shown in FIG. 1. The configuration memory 6 and/or the control computer 5 may thereby read out the security information M of the electronic memories 3, for example, via an I2C bus or SPI, and, for example, depending on the read out security information item M or the read out security information items M, may create a cryptographic key that may be used to decrypt configuration data of the field device 1 stored in encrypted form in the configuration memory 6.

In one embodiment, the tamper protection device 4 is configured such that the tamper protection device does not provide the memory content of the electronic memories 3 directly, but a value dependent thereon. Thus, for example, the tamper protection device 4 may be configured to carry out a processing act for the use of the security information M of the electronic memories 3. The result of this processing act is then provided as security information M'. In this way, a challenge-response method may be carried out. The tamper protection device 4 provides a response that is dependent on data stored in the electronic memories 3 of the tamper protection device 4 and the challenge value transmitted to the tamper protection device 4. The response value may, for example, be an identical copy of the security information M' provided by the tamper protection device 4, a checksum (e.g., a CRC checksum or a hash value such as SHA-1).

In one embodiment, the security information M stored in the electronic memories 3 is randomly or pseudo-randomly generated.

Figure 2:
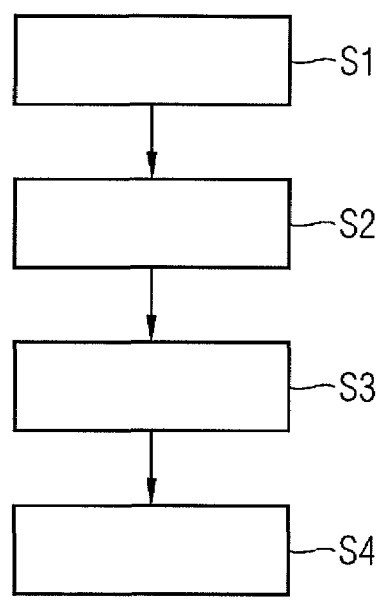
FIG. 2 shows a method for manufacturing a field device with a tamper protection device according to the first embodiment.

FIG. 2 shows a flowchart for one embodiment of a method for manufacturing a field device with a tamper protection device. In FIG. 2, reference number S1 denotes the act of manufacturing the field device 1, and reference number S2 denotes the act of manufacturing the tamper protection device 4. Reference number S3 denotes the disposing of the tamper protection device 4 on the field device 1, and reference number S4 denotes the connection of the tamper protection device 4 to a monitoring device to monitor the tamper protection device.

The present embodiments have a plurality of advantages. The present embodiments enable the detection of a physical manipulation of a field device without the need for a continuous monitoring. In this way, for example, no continuous power supply is required. In addition, the tamper protection device may also be simply and economically manufactured (e.g., by printable electronics and/or printable memory). A further advantage is that an extensive protection may also be achieved as a result. A further advantage is that a complex sensor system for detecting a physical manipulation is not required. In addition, an increased protection against physical manipulations is provided by the tamper detection device, beyond the tamper protection devices already known.

Although the present invention has been described above based on example embodiments, the invention is not restricted thereto, but is modifiable in a variety of ways.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A tamper protection device for protecting a field device against tampering, the tamper protection device connected to at least one monitoring device and comprising:
    a tamper protection carrier for the field device configured as a foil; and
    at least one electronic memory imprinted flatly on the foil, wherein the at least one electronic memory is disposed in at least one partial area on the tamper protection carrier, and the at least one electronic memory stores at least one predefinable security information item for detecting tampering of the field device in an iterative, non-continuous manner after a specified time interval has elapsed,
    wherein the at least one predefinable security information item is configured to be overwritten after the specified time interval,
    wherein the at least one predefinable security information item can no longer be overwritten following at least partial physical damage to the tamper protection carrier; and
    wherein the field device is configured to transmit a status message to a control station over a network in response to a detection of the at least partial physical damage to the tamper protection carrier based on the at least one predefinable security information item.

2. The tamper protection device of claim 1, wherein the foil is a plastic foil.

3. The tamper protection device of claim 1, wherein the at least one electronic memory is configured to provide another information item dependent on and different from the at least one predefinable security information item.

4. The tamper protection device of claim 1, wherein the at least one predefinable security information item has a size of at least 32 bits, 64 bits, 128 bits, 256 bits, 512 bits, or 1024 bits, for each unit area, and
    wherein the unit area is less than 5 cm$^2$, 2.5 cm$^2$, 1 cm$^2$, 5 mm$^2$, or 1 mm$^2$.

5. The tamper protection device of claim 1, wherein the at least one electronic memory comprises a plurality of electronic memories, the plurality of electronic memories being configured to provide a common security information item.

6. The tamper protection device of claim 1, wherein the at least partial physical damage to the tamper protection carrier at least partially destroys the at least one electronic memory.

7. The tamper protection device of claim 1, wherein the at least partial physical damage to the tamper protection carrier comprises physical manipulation of the tamper protection carrier.

8. The tamper protection device of claim 7, wherein the physical manipulation of the tamper protection carrier at least partially destroys the at least one predefinable security information item.

9. The tamper protection device of claim 7, wherein the physical manipulation of the tamper protection carrier comprises drilling into the tamper protection carrier.

10. The tamper protection device of claim 7, wherein the physical manipulation of the tamper protection carrier comprises breaking open the tamper protection carrier.

11. The tamper protection device of claim 1, wherein the field device is a signal installation.

12. The tamper protection device of claim 1, wherein, in an event of damage to the tamper protection device, the tamper protection device is configured to autonomously delete at least one key stored in the at least one electronic memory, destroy at least one electronic component of the field device with a short circuit, or a combination thereof.

13. A method for manufacturing a field device with a tamper protection device, the method comprising:
manufacturing the field device;
manufacturing the tamper protection device as a foil on which electronic memories are disposed;
attaching the tamper protection device to the field device; and
connecting the tamper protection device to a monitoring device to monitor the tamper protection device for physical damage to the tamper protection device,
wherein the monitoring device is configured to monitor the tamper protection device in an iterative, non-continuous manner after a specified time interval has elapsed,
wherein at least one predefinable security information item is configured to be overwritten after the specified time interval;
wherein the monitoring device is configured to determine a time period of the physical damage based on when a predefinable security item can no longer be overwritten in at least electronic memory of the electronic memories of the tamper protection device; and
wherein the field device is configured to transmit a status message to a control station over a network in response to a detection of the physical damage to the tamper protection device based on the predefinable security information item.

14. A field device comprising:
a tamper protection device for protecting the field device against tampering, the tamper protection device comprising:
a tamper protection carrier configured as a foil; and
at least one electronic memory, wherein the at least one electronic memory is disposed in at least one partial area on the tamper protection carrier,
wherein the at least one electronic memory stores at least one predefinable security information item in an iterative, non-continuous manner for detecting tampering of the field device after a specified time interval has elapsed,
wherein the at least one predefinable security information item is configured to be iteratively overwritten after the specified time period has elapsed,
wherein the at least one predefinable security item can no longer be overwritten following at least partial physical damage to the tamper protection device;
wherein the field device is configured to transmit a status message to a control station over a network in response to a detection of the at least partial physical damage to the tamper protection device based on the at least one predefinable security information item.

15. A tamper protection system comprising:
at least one field device comprising a processor and a device memory;
at least one tamper protection device for protecting the at least one field device against tampering, the at least one tamper protection device comprising:
a tamper protection carrier configured as a foil; and
at least one electronic memory imprinted flatly on the foil, wherein the at least one electronic memory is disposed in at least one partial area on the tamper protection carrier, wherein the at least one electronic memory stores at least one predefinable security information item in an iterative non-continuous manner for detecting tampering of the field device after a specified time interval has elapsed, wherein the at least one predefinable security information item is configured to be overwritten after a specified time interval has elapsed, and wherein the at least one predefinable security item can no longer be overwritten following at least partial physical damage to the tamper protection device; and
at least one monitoring device, wherein the at least one tamper protection device is disposed on the at least one field device for the tamper protection, wherein the at least one monitoring device is connected to the at least one tamper protection device, and wherein the at least one monitoring device is configured to determine a time period of the at least partial physical damage using the at least one predefinable security information item;
wherein the at least one field device is configured to transmit a status message to a control station over a network in response to a detection of the at least partial physical damage to the tamper protection device based on the at least one predefinable security information item.

16. The tamper protection system of claim 15, wherein the at least one monitoring device is configured to check a security information item of the at least one tamper protection device and to de-activate or activate the field device depending on a result of the check.

17. A method of using a tamper protection device for protecting a field device against tampering, the tamper protection device comprising a tamper protection carrier configured as a foil, and at least one electronic memory, wherein the at least one electronic memory is disposed in at least one partial area on the tamper protection carrier, the method comprising:
storing at least one predefinable security information item in the at least one electronic memory for detecting tampering of the field device, wherein the at least one predefinable security information item is configured to be overwritten after a specified time interval;
detecting at least partial physical damage to the tamper protection device based on an inability for the at least one predefinable security information item to be overwritten into the at least one electronic memory;
determining a time period of the at least partial physical damage based on the at least one predefinable security information item; and
transmitting a status message to a control station over a network in response to a detection of the at least partial physical damage to the tamper protection device based on the at least one predefinable security information item.

18. The method of claim 17, wherein the tamper protection device is a security seal.

* * * * *